Sept. 29, 1959 H. C. GOODRICH 2,906,818

TRANSISTOR PHASE DETECTOR CIRCUIT

Filed May 1, 1957

INVENTOR.
HUNTER C. GOODRICH
BY [signature]
ATTORNEY

United States Patent Office 2,906,818

Patented Sept. 29, 1959

2,906,818

TRANSISTOR PHASE DETECTOR CIRCUIT

Hunter C. Goodrich, Collingswood, N.J., assignor to Radio Corporation of America, a corporation of Delaware Application May 1, 1957, Serial No. 656,443

6 Claims. (Cl. 178—7.3)

This invention relatse to electrical circuit means for comparing the phase relationship between electrical signals, and more particularly to phase comparison circuits using semiconductor amplifier devices for deriving control voltages or currents indicative of the existing phase relationship between two recurrent electrical signals.

There are many instances, particularly in electrical signaling systems, where there is a need for phase comparing circuits capable of detecting the sense and magnitude of phase difference between two electrical signals. In a common type of phase comparison circuit, a local controllable wave is compared in phase with a standard or fixed reference wave to develop a control signal which may be applied to control the generation of the local wave so as to bring it into synchronous frequency or phase relationship with the standard reference wave. Examples of this type of circuit action may be seen in automatic frequency control systems used for synchronizing the line deflection circuits in television receivers.

It is generally important in phase detector circuits that an error voltage be developed only when and if both signals to be compared are present, that is to say, a given phase comparator circuit should be so balanced that the cessation of one of the signals to be compared, especially the standard or sync signal, as it is called in television deflection AFC systems, does not produce a false error voltage indicating a phase difference that may not exist. When a semiconductor amplifier or transistor is caused to form the basis of a balanced phase detector circuit, this problem becomes rather troublesome. Even assuming that the transistor used is perfectly symmetrical, the source impedance of the signal applied to the base electrode of the transistor causes an inherent amount of circuit unbalance which in the absence of base electrode signal causes the development of an undesirable error voltage.

It is, therefore, an object of the present invention to provide an improved phase comparison apparatus.

Another object of the present invention resides in the provision of an improved transistor phase detector system wherein the output error signal corresponds to zero phase difference in the absence of one of the signals to be compared.

In accordance with the present invention, a phase detector circuit is provided embodying a semiconductor amplifier device having a base electrode and two other operating electrodes cooperatively associated therewith. A first input circuit for a first of the signals to be compared is connected between the first and second operating electrodes and a second input circuit for the second of the signals to be compared is connected between the base and the first input circuit. A third input circuit for a portion of the first signal is connected to the semiconductor amplifier device in series with the second input circuit. By proper selection of the magnitude of the portion of the first signal applied to the third input circuit as explained more fully hereinafter, the magnitude and polarity of an output error signal derived from an output circuit connected between the two operating electrodes may be made to correspond to a zero phase difference datum value, upon the conditional absence of the second signal.

The novel features which are considered to be characteristic of this invention are set forth with particularity in the appended claims. The invention itself, however, both as to its organization and method of operation as well as additional objects and advantages thereof will best be understood from the following description when read in connection with the accompanying drawings in which:

Figures 1, 2, 3:
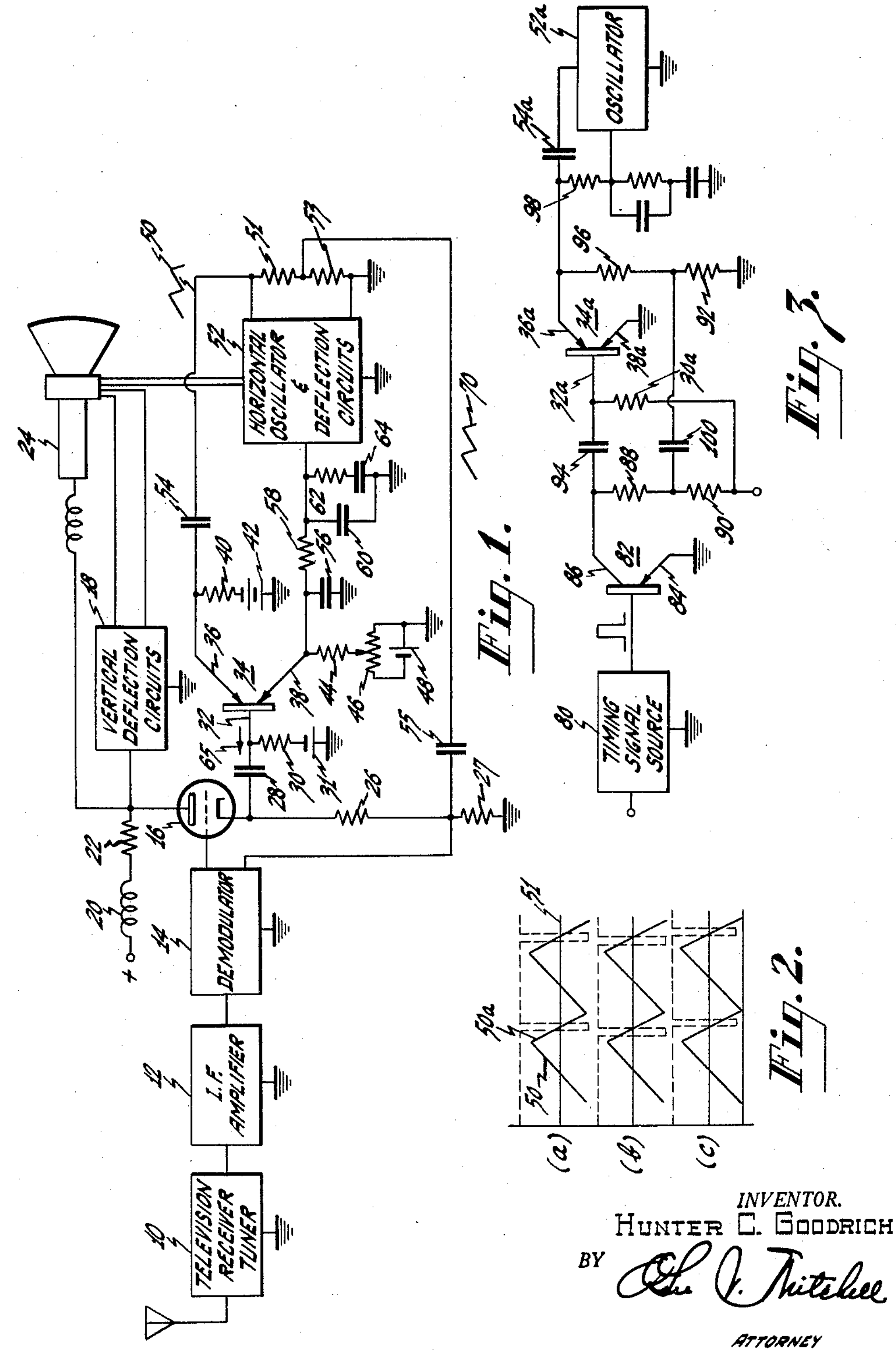
Figure 1 is a schematic circuit diagram partially in block form of a television receiver provided with an automatic frequency control circuit for controlling the cathode ray beam deflection rate of the receiver embodying the novel features of the present invention.
Figure 2 is a graphical illustration of exemplary signal relationships which may be encountered in the practice of the present invention.
Figure 3 is a schematic circuit diagram partially in block form of another embodiment of the phase comparison system of the invention.

Referring now to the drawings and particularly to Figure 1, the television receiver is provided with a tuner 10 which includes tunable circuits for selecting any one of a plurality of television channels. The received television signal is converted in the tuner 10 to a corresponding intermediate frequency signal which is amplified in an intermediate frequency amplifier 12. The intermediate frequency amplifier 12 is in turn coupled to a signal demodulator or second detector 14 which recovers the video modulation components from the intermediate frequency signals. The demodulated video signal is then amplified in a video amplifier including an electron tube 16. The amplified video signal is developed across a load circuit comprising a resistor 22 and a peaking coil 20 and is applied to a kinescope 24 for modulation of the cathode ray beam therein.

A vertical deflection circuit 18 is connected with the output circuit of the video amplifier tube 16. The vertical deflection circuit 18 may comprise any suitable means for utilizing the vertical synchronizing components of a composite video signal to synchronize the vertical deflection generator with the field rate of the received signal.

The cathode of the video amplifier tube 16 which is connected to ground through a pair of serially connected unbypassed cathode resistors 26 and 27 is coupled through a resistance-capacitance network comprising a capacitor 28 and a resistor 30 to the base 32 of a symmetrical junction transistor 34. In addition to the base electrode 32 the transistor 34 is also provided with a pair of operating electrodes 36 and 38. The electrical operating characteristics of each of the operating electrodes with respect to the base is substantially the same whereby either of the operating electrodes may serve as emitter or collector depending upon the relative polarity of the electrodes with respect to the base electrode. For example, as shown in Figure 1, if the operating electrode 36 is positive with respect to the base 32 it operates as the emitter, but if this electrode is negative with respect to the base it operates as the collector. The operating electrode 38 is connected through a resistor 44 to the tap of a potentiometer 46. The potentiometer 46 in turn is connected across a second source of biasing potential shown as the battery 48 so that the tapping point to which the resistor 44 is connected is negative with respect to ground. The control voltage for regulating the horizontal oscillator 52 is derived across the terminals of a capacitor 56 which is connected between the electrode 38 and ground.

Because the oscillator normally operates with a negative control voltage which may be varied in a more negative or a less negative direction, the voltage provided by the battery 48 has been added. By tapping the proper amount of negative voltage off the potentiometer 46 the initial negative voltage corresponding to the proper phase relation between the sync signals and the deflection waves may be obtained. The potentiometer 46 thus serves as a horizontal hold control. If required by the particular design characteristics of the oscillator, a positive reference voltage may replace the negative reference as the control voltage, or alternatively the reference voltage may be omitted entirely so that zero voltage output is produced in the in-phase condition.

The operating electrode 36 is connected through a resistor 40 to the negative terminal of a potential source shown as the battery 42. The battery 42 which has its positive terminal grounded is selected to maintain the electrode 36 at substantially the same negative potential with respect to ground as appears at the electrode 38 due to the battery 48. Another battery 31 is provided in series with the resistor 30 between the base 32 and ground. The potential of the battery 31 in combination with the potential developed across the resistor 30 provide a bias for the transistor 34 so that base current flows only during the sync pulses.

The deflection wave which is to be compared in phase with a periodic signal comprising the received horizontal synchronizing signal component of the video wave is shown in the waveform 50. The deflection wave 50 which is indicated as being a periodic signal having a sawtooth waveform is developed by the television receiver horizontal oscillator and deflection circuits 52 across the resistors 51 and 53 which have a relatively low resistance compared to the path impedance defined through the transistor 34. The deflection wave is coupled to the operating electrode 36 through a coupling capacitor 54 which is made sufficiently large to present very little impedance to the signal frequencies. The horizontal oscillator or sawtooth generator 52 is adapted for control by a D.-C. voltage which is derived as a result of the phase comparison between the synchronizing signals and the deflection wave. Any error voltage developed across the terminals of the capacitor 56 which is indicative of the phase difference between the deflection wave and the synchronizing signal is then applied through a low pass filter comprising a capacitor 56 and a resistor 58 to the horizontal oscillator. Additional filtering for the derived control voltage may be provided by a capacitor 60 which is connected in parallel with the series resistor 62-capacitor 64 combination. As is well known in the art, if the error signal developed across the load resistor 44 accurately depicts by its polarity and magnitude, the sense and magnitude of the phase difference between the deflection wave and the synchronizing signal, the frequency control circuit may be made to maintain a predetermined mode of synchronism between the deflection wave of the synchronized signals.

The portion of the sawtooth waveform developed across the resistor 53 is applied through the coupling capacitor 55 to the junction of the resistors 26 and 27.

In the operation of the phase comparison circuit of the invention, the video signal developed across the cathode resistors 26 and 27 is of a polarity such that the sync pulse excursions are in a negative direction. These negative sync pulses tend to charge the capacitor 28 through the base of the transistor 34 with a direction of current flow indicated by the arrow 65. The majority of this current may flow through either of the operating electrodes depending upon the potential relationships of the operating electrodes 36 and 38 to one another and to the base 32 at the time of the sync pulse. During the interval between sync pulses the capacitor 28 will discharge through the resistor 30 to bias the base 32 positive with respect to the operating electrodes. The discharge time constant of the capacitor 28-resistor 30 network is considerably greater than the horizontal line period so that the base 32 is maintained positive at substantially the sync peak amplitude. The absence of a sawtooth feedback network including the coupling capacitor 55, the amplitude of the sync pulse should be made greater than the peak to peak amplitude of the waveform 50, so that transistor type current conduction within the transistor 34 will occur only during the sync pulses. Transistor action can occur during the sync pulses only by virtue of what appears as a forward bias current through the transistor due to the charging of capacitor 28 in the amount corresponding to whatever charge has leaked off through the resistor 30 during the period between successive pulses. Thus it can be seen that the only portions of the video signal having any effect on the phase comparison circuit are the sync pulses.

An understanding of the operation of the phase detector, per se, may readily be obtained by reference to the graphs of Figure 2. If during the "on" period of the amplifier corresponding to the individual sync pulses, the operating electrode 36, in response to the sawtooth signal 50, tends to swing positively with respect to circuit ground and operating electrode 38, the electrode 36 will act as an emitter and the electrode 38 will act as a collector. Signal current then flows through the transistor 34 and around the loop including the capacitor 56, the horizontal oscillator and deflection circuits 52, and the capacitor 54. This charges the capacitor 56 so that the electrode 38 is less negative with respect to ground. On the contrary, should the instantaneous potential on the operating electrode 36 be negative with respect to electrode 38 during the "on" time of the transistor 34, the capacitor 56 will tend to charge in an opposite polarity relation, with the electrode 36 acting as collector and the electrode 38 acting as emitter. Under such conditions, the average potential on the electrode 38 will be more negative with respect to circuit ground.

Returning now to the consideration of Figure 2*a*, if the sync pulses occur during the return or "flyback" portion 50*a* of the sawtooth 50, such that the intersection of the A.C. axis 51 with the return time slope 50*a* substantially bisects in time the sync pulse, the average potential on the electrode 38 with respect to circuit ground will be substantially that tapped off the potentiometer 46. This means that a substantially zero error voltage will be applied to the frequency control circuit for the oscillator 52. Should the phase of the oscillator 52 shift in a direction corresponding to a decrease in frequency, the waveform relation of Figure 2*b* will obtain. Under these conditions, it will be seen that the electrode 36 acts as the emitter during the "on" time of the transistor 34, thereby resulting in a less negative control voltage at the electrode 38. This may be made to effect a temporary increase in the speed of oscillator 52 to correct for this phase error. Should the oscillator 52 tend to speed up to produce the phase relation depicted by Figure 2*c*, a more negative control voltage will be developed at the electrode 38 thereby tending to slow down the oscillator 52. It is thereby seen that an automatic frequency and phase control type of operation is provided by virtue of the basic phase detecting and comparing action of the circuit, involving the transistor 34.

In the practical employment of the arrangement of Figure 1, and still ignoring the circuit including the capacitor 55, an error voltage will be developed at the electrode 36 should the synchronizing signal be interrupted or discontinued. This comes about as follows: In the absence of a timing signal, the base 32 of the transistor 34 may be considered as floating. Whichever of the operating electrodes is then more positive with respect to circuit ground will act as an emitter in establishing transistor action within the amplifier. This again is predicated upon the assumption that the transistor 34 expresses PNP type transistor characteristics. It is, therefore, apparent that in the absence of the synchronizing signals, the positive portion sawtooth wave cycle drives the operating electrode 36 positive with respect to the base 32 thereby causing a current flow indicated by the arrow 65 to charge the capacitor 28. The emitter collector current during this portion of the cycle flows through the resistors 44, 46 and 40 to produce a net positive potential at the electrode 38. During the negative portion of the sawtooth wave 50, the base is positive with respect to both of the operating electrodes, and no transistor action occurs. The positive error voltage appearing at electrode 36 resulting from this action is highly undesirable, since it tends to establish the operating frequency of the oscillator 52 at a value greatly displaced from the synchronizing signal when and if it again is applied to the base. Such would cause the circuit to demand a considerable time for readjustment and resynchronization upon reestablishment of the synchronizing signal.

In accordance with the present invention, a portion of the sawtooth waveform applied between the operating electrodes 36 and 38 is coupled through the capacitor 55 and developed across the resistor 27. The sawtooth voltage is thus coupled in series with the video signal to the base 32 of the transistor 34. For optimum balance of the phase detector circuit using a substantially symmetrical transistor it will be shown that the amplitude of the sawtooth fed to the base 32 should be about one-half of that applied between the operating electrodes 36 and 38. If desired the resistors 51 and 53 may be replaced by a variable resistor so that adjustments may be made to compensate for any dissymmetry in the transistor operating characteristics.

The sawtooth voltage 70 on the base 32 is in phase with the sawtooth voltage 50 applied between the operating electrodes 36 and 38. Thus in the absence of the synchronizing signals, the instantaneous potential between the base 32 and the operating electrode 36 is reduced by an amount equal to the amplitude of the sawtooth voltage 70, and the potential between the base 32 and operating electrode 38 corresponds to the amplitude of the sawtooth voltage 70.

During the positive swing of the sawtooth wave 50, the operating electrode 36 operates as the emitter causing base current to flow charging the capacitor 28. The emitter collector current flows through the load resistors 44, 46, and 40 tending to make the operating electrode 38 positive. However during the negative swing of the sawtooth wave 50, the base 32 is negative due to the sawtooth wave 70 thus providing a forward bias between the base and electrode 38 which acts as the emitter. This produces an emitter-collector current through the load resistor which tends to make the operating electrode negative with respect to ground. If the transistor is symmetrical, and the forward bias tending to produce emitter-collector current is symmetrical during the positive and negative swings of the sawtooth wave 50, the net error voltage at the electrode will be zero. That is the error voltage produced by current in one direction through the transistor is equal and opposite to the error voltage produced by current in the opposite direction therethrough. This condition is achieved in a symmetrical transistor, by adjusting the sawtooth wave 70 to an amplitude one-half that of the sawtooth wave 50. This produces a forward bias between the base 32 and the operating electrode 36 during the positive portion of the sawtooth cycle which is equal to the forward bias between the base 32 and the operating electrode 38 during the negative portion of the cycle. Naturally if the transistor does not exhibit perfectly symmetrical conduction, the sawtooth amplitude fed to the base may be adjusted to provide the proper relative biases to balance the circuit.

The balancing circuit described is seen as very important in realizing optimum performance from the semiconductor amplifier phase comparator circuit shown. As discussed above, in the absence of sync, the transistor 34 will be turned on by the base current resulting from the capacitance between base and ground. Transistor nonlinearity results from the corresponding collector voltage developing an error voltage. As the base driving impedance is increased by reducing the size of the capacitor 28 the resulting unbalance decreases. However a small base driving capacitor results in compression of the sync signal at the base, so that a larger sync signal is required to cut off the transistor between sync pulses.

A circuit in accordance with the invention permits the coupling capacitor 28 to be large enough to produce a high peak current in the transistor 34 and also allows the time constant of the capacitor 28-resistor 30 to be great enough to produce sync separation action at the base 32.

In summary, a first input circuit for deflection waves is connected between the operating electrodes 36 and 38. The first input circuit includes the deflection wave generator resistors 51 and 53, the coupling capacitor 54 and the capacitor 56. A second input circuit for synchronizing signals is connected between the base and the first input circuit. The second input circuit includes the resistors 26 and 27 which is coupled to the base 32 through the coupling capacitor 28, and which is connected through ground to the first input circuit. A third input for a portion of the deflection waves is connected in series with the second input circuit. The third input circuit includes the resistor 53, the coupling capacitor 55, and the resistor 27. Since the larger portion of the sync signal is developed across the resistor 26, the second input circuit may be considered as in series with the third input circuit. By proper selection of the amplitude of the deflection signal fed to the third circuit, zero phase error output voltage will be produced in the absence of the synchronizing signal. In a perfectly symmetrical transistor, this condition is effected when the deflection signal to the third circuit is one-half that fed to the first input circuit.

Without the circuit including the coupling capacitor 55, it can be seen that the peak-to-peak amplitude of the sync signal must be equal to or exceed the peak-to-peak amplitude of the sawtooth voltage applied between the operating electrodes 36 and 38, so that transistor action only occurs during the sync pulse interval. In other words the base 32 must be maintained more positive than the most positive excursion of either of the operating electrodes. It will be understood that the sawtooth voltage amplitude in the phase detector circuit will be fixed by the power requirements of the control circuit for the oscillator. Thus the sync signal must be amplified to provide a peak-to-peak voltage greater than that established by the sawtooth voltage.

In accordance with the invention the maximum required amplitude of the sync signal is reduced since the base 32 swings positive and negative with the operating electrodes 36. If the sawtooth voltage on the base 32 is one-half that applied between the operating electrodes 36 and 38, the maximum potential between the base 32 and either of the operating electrodes 36 and 38 is reduced by one-half. This reduces the amplification of the sync signal required for proper operation of the circuit.

Troublesome impulse noise which is characterized by a greater amplitude and a longer duration than the sync signals tends to produce an erroneous control voltage, the effect of which is to pull the horizontal oscillator out of synchronism. In the phase comparison circuit described, the effect of such impulse noise on the control voltage is greatly limited by the capacitor 56 which is in the signal current path for the transistor 34. An R.-C. network comprising essentially the average resistance between the operating electrodes of the transistor 34 which is on the order of 10 ohms, and the capacitance of the capacitor 56 has a time constant which is made just large enough to pass normal currents due to the horizontal synchronizing pulses. During longer noise impulses, however, the capacitor 56 quickly charges and essentially cuts off the transistor 34, the only other paths for the phase detector signal current is through the resistors 44 and 58 which are made large enough to materially limit noise currents. Thus the energy supplied by noise impulses is materially attenuated, and the resulting D.C. error voltage developed at the operating electrode 38 due to noise impulses is correspondingly lower.

The effects of impulse noise on the control voltage is also greatly reduced in that the discharge time constant of the capacitor 56 and the resistor 58 is made relatively short such as on the order of two horizontal line periods. This means that any charge developed across the terminals of the capacitor 56 by noise impulses will be rather quickly discharged through the resistors 44 and 58 so that the control voltage will more quickly resume the ordinary operating level provided by the phase comparison of the sync pulse with deflection sawtooth wave.

The noise immunity of phase comparison circuits embodying the invention have been found to be comparable to presently existing phase comparators using a separate sync separator stage.

The following circuit values were found to give good results in a practical application of the present invention to home type television receiving equipment. It will be understood that other circuit values may be used without departing from the scope of the present invention. For convenience, the capacitors will be designated as "C" and the resistors as "R," each followed by the index number assigned to such elements in the drawings.

| | |
|---|---|
| R26—250 ohms | R62—100 ohms |
| R27—33 ohms | C28—.022 μf |
| R30—37,000 ohms | C54—2.0 μf |
| R40—100 ohms | C55—2.0 μf |
| R44—1000 ohms | C56—.22 μf |
| R51—1 ohm | C60—2.0 μf |
| R53—1 ohm | C64—25.0 μf |
| R58—470 ohms | |

Referring to Figure 3, a timing signal source 80 provides a periodic timing signal of predetermined phase which is applied between ground and the base of a transistor amplifier 82. The transistor 82 shown as a PNP type junction transistor is provided with a collector 86 which is connected through a pair of serially connected load resistors 88 and 90 to the negative terminal source of operating potential. The transistor 82 also has an emitter 84 which is connected directly to ground. The timing signal developed at the collector 86 is coupled through a capacitor 94 to the base 32*a* of the phase comparator transistor 34*a*.

The phase comparison circuit shown in Figure 3 is generally similar in operation to that shown and described in connection with Figure 1. For example, the timing wave from the oscillator 52*a* is coupled between the operating electrodes 36*a* and 38*a* of the transistor 34*a*. The resistors 96 and 92 are connected between the operating electrodes 36*a* and 38*a* to comprise the direct current return path for the transistor 34*a*. A control voltage indicative of the phase relation betewen the timing signal from the source 80 and the oscillator signal from the oscillator 52*a* is developed at the control electrode 36*a*. This control voltage is filtered through the filter network including the capacitor 54*a* which is effectively grounded through the low internal impedance of the oscillator 52*a* and the resistor 98. Additional filtering may be provided as shown in Figure 3 before application to the oscillator 52*a* circuit to control the frequency thereof in step with the frequency of the periodic source 80.

In the operation of the circuit shown in Figure 3, the resistors 92 and 96 provide a voltage divider for the oscillator 52*a* signal, and the portion of this signal appearing across the resistor 92 is applied through the capacitor 100 across the resistor 90. The resistor 92 may be made larger than the resistor 96 so that the net resistance from the lower terminal of the resistor 96 as viewed in Figure 3 to ground is equal to resistor 96. In other words, the net resistance provided by the resistor 92 in parallel with the input load, primarily the resistor 90, connected across the resistor 92 has an impedance which is substantially equal to that of resistor 96. In this manner, one-half the signal from the oscillator 52*a* is developed across the resistor 92 and is coupled through the capacitor 100 and the coupling capacitor 94 to the base 32*a* of the phase comparator transistor 34*a*. In other respects, the operation of the circuit shown in Figure 3 is the same as that described in connection with Figure 1.

The phase comparator circuit described above is balanced to provide zero error output control voltage in the absence of signals from a timing signal source such as the sync signal in television receiving systems. The circuit also permits the use of a lower amplitude driving signal to obtain the proper action of the phase comparator transistor by virtue of the fact that a lower maximum potential exists between the base and either of the operating electrodes as a result of the balancing voltage.

What is claimed is:

1. A phase detector for providing a control voltage in accordance with the phase difference between first and second periodic signals comprising, in combination, a substantially symmetrical transistor having a base electrode and a pair of operating electrodes, means providing a first input circuit for a source of said first periodic signals connected between said operating electrodes for applying said first periodic signals therebetween, means providing a second input circuit for a source of said second periodic signals connected between said base electrode and said first input circuit for applying said second periodic signals therebetween, means including a load impedance connected between said operating electrodes for deriving a control voltage indicative of the phase relation between said first and second periodic signals, and means providing a substantially zero control voltage in the absence of said second periodic signals including means for applying a portion of said first periodic signal in series with said second input circuit.

2. A balanced phase detector for providing a control voltage in accordance with the phase difference between first and second periodic signals comprising in combination a substantially symmetrical transistor having a base electrode and a pair of operating electrodes, means providing a first input circuit for a source of said first periodic signals connected between said operating electrodes for applying said first periodic signal therebetween, means providing a second input circuit for a source of said second periodic signals of substantially the same frequency as said first periodic signals connected between said base electrode and said first input circuit for applying said second periodic signals therebetween, means including a load impedance connected between said operating electrodes for deriving a control voltage indicative of the phase relation between said first and second periodic signals, means providing a third input circuit connected in series with said second input circuit, and means for applying signals from said first source of signals to said third input circuit of an amplitude to provide substantially zero phase error indication voltage across said load impedance in the absence of said second periodic signals.

3. A phase detector circuit for comparing the phase of a first periodic signal with the phase of a second periodic signal to produce an output voltage of a magnitude and sense to indicate the magnitude and sense between the signals, comprising a substantially symmetrical transistor having a base electrode and a pair of operating electrodes, means providing a first input circuit for a source of said first periodic signals connected between said operating electrodes for applying said first periodic signals therebetween, means providing a second input circuit for a source of said second periodic signals of substantially the same frequency as said first signals connected between said base electrode and said first input circuit for applying said second periodic signals therebetween, means including a load impedance connected between said operating electrodes for deriving a control voltage indicative of the phase relation between said first and second periodic signals, means providing a third input circuit connected in series with one of said first and second input circuits, and means providing a substantially zero control voltage in the absence of said second periodic signals including means for applying to said third input circuit a fractional portion of signals from the other of said first and second input circuits.

4. For use in television receiving systems a phase detector circuit for comparing the phase of locally generated deflection waves with received synchronizing components of a composite video wave to produce an output voltage of a magnitude and sense to indicate the magnitude and sense of a phase difference between the signals, a circuit for maintaining substantially zero phase error control voltage in the absence of the received synchronizing signals applied to said detector circuit comprising a transistor having a base electrode and a pair of operating electrodes, means providing a first input circuit for synchronizing signals connected between said base and said operating electrodes for applying said synchronizing signals to said base, means for applying said locally generated deflection waves between said operating electrodes, means providing a second input circuit connected in series with said first input circuit, and means coupling a fractional portion of said deflection wave to said second input circuit, said fractional portion of said deflection wave being of an amplitude to maintain zero phase error output voltage from said phase detector circuit in the absence of received synchronizing signals.

5. In a television receiving system of the type including a deflection wave generator means having a frequency determining circuit responsive to the sense and magnitude of a control voltage for controlling the frequency of said generator, a phase detector circuit including a transistor having a base electrode and a pair of operating electrodes, a video amplifier circuit for composite video television signals having a recurrent synchronizing pulse component defined by signal intelligence excursions of greater amplitude than associated image intelligence excursions and subject to noise impulses of greater amplitude and longer duration than said synchronizing pulses, a pair of impedance elements serially connected between said video amplifier circuit and ground to provide an output impedance for said video amplifier, an input circuit for said transistor including a capacitor connecting said base to the ungrounded terminal of said serially connected impedances, said capacitor adapted to be charged by base current in said transistor, resistance means providing a discharge path for said capacitor connected between said base and a point of reference potential, said capacitor and resistance means having a time constant longer than the interval between successive synchronizing pulses to maintain a reverse bias between said base and operating electrodes except during the synchronizing pulse interval thereby effectively separating the synchronizing pulses from the remainder of the video signal, means connecting one of said operating electrodes with said point of reference potential, means including a capacitor for applying deflection wave signals of substantially the same periodicity as said synchronizing pulse components from said generator between said operating electrodes, said capacitor in combination with resistive and capacitive components of said last-named means having a time constant which provides very low impedance to signal currents due to said synchronizing pulse components but relatively greater impedance to noise impulses of longer duration than said synchronizing pulses, a load resistor providing a direct current path connected between said operating electrodes, means coupled to said deflection generator for providing a deflection wave of an amplitude substantially equal to one-half the amplitude of the deflection signal applied between said operating electrodes, a capacitor connecting said last-named means to the junction of said serially connected impedance elements, filter means connected across at least a portion of said load resistor for deriving a control voltage representative of the sense and magnitude of the phase difference between said synchronizing pulses and said deflection wave, said filter means having a discharge time constant selected to be long enough to provide a substantially constant direct potential output in response to current pulses through said load impedance due to synchronizing pulses yet permit relatively rapid discharge of erroneous potentials due to noise impulses.

6. In a television receiving system of the type including deflection wave generating means having a frequency determining circuit responsive to the sense and magnitude of a control voltage for controlling the frequency of said generator, a phase detector circuit including a transistor having a base electrode and a pair of operating electrodes, a signal input circuit for composite video television signals having a recurrent synchronizing pulse component defined by signal intelligence excursions of greater amplitude than associated image intelligence excursions, and said input circuit including a capacitor connected to said base for charging by base current in said transistor and resistance means providing a discharge path for said capacitor connected between said base and a point of reference potential, said capacitor and resistance means having a time constant longer than the interval between successive synchronizing pulses to maintain said base at a voltage with respect to ground corresponding to the synchronizing pulse amplitude, means connecting one of said operating electrodes with said point of reference potential, means for applying deflection wave signals from said generator between said operating electrodes, the resistive and capacitive components of said last-named means providing a time constant on the order of the duration of a synchronizing pulse, means providing a load resistor connected between said operating electrodes, means coupling said deflection wave generator across at least a portion of said input circuit for providing a deflection wave which has an amplitude of one-half the amplitude of the deflection wave applied between said operating electrodes in series with said composite video signal, and filter means connecting said frequency determining circuit across at least a portion of said load resistor for deriving a control voltage representative of the sense and magnitude of the phase difference between said synchronizing pulses and said deflection wave.

References Cited in the file of this patent

UNITED STATES PATENTS 2,766,380 Kroger ---------------- Oct. 9, 1956